(12) United States Patent
Kitani et al.

(10) Patent No.: US 12,118,100 B2
(45) Date of Patent: Oct. 15, 2024

(54) DATA DISTRIBUTION INTERMEDIARY DEVICE AND DATA DISTRIBUTION INTERMEDIARY METHOD

(71) Applicant: Hitachi, Ltd., Tokyo (JP)

(72) Inventors: Mitsuhiro Kitani, Tokyo (JP); Syafril Bandara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 226 days.

(21) Appl. No.: 17/853,431

(22) Filed: Jun. 29, 2022

(65) Prior Publication Data
US 2023/0034498 A1 Feb. 2, 2023

(30) Foreign Application Priority Data

Jul. 29, 2021 (JP) ................. 2021-124775

(51) Int. Cl.
G06F 21/00 (2013.01)
G06F 21/60 (2013.01)
G06F 21/62 (2013.01)

(52) U.S. Cl.
CPC ........ G06F 21/604 (2013.01); G06F 21/6245 (2013.01)

(58) Field of Classification Search
None
See application file for complete search history.

(56) References Cited

U.S. PATENT DOCUMENTS 10,366,250 B1* 7/2019 Chen ................... G06F 21/6245
10,679,296 B1* 6/2020 Devereaux ............. G06F 16/24
11,119,985 B1* 9/2021 Alagianambi .......... G06F 9/541
11,275,859 B2* 3/2022 Shrinivasan ........ G06F 21/6245
11,386,510 B2* 7/2022 Al-Kofahi ............. G06F 16/332

(Continued)

FOREIGN PATENT DOCUMENTS

EP 3370201 A1 9/2018
JP 2020-129311 A 8/2020

OTHER PUBLICATIONS

Wang, Xiaowen; Huang, Yan. Research on Semantic Based Metadata Method of SWIM Information Service. 2020 IEEE 2nd International Conference on Civil Aviation Safety and Information Technology. https://ieeexplore.ieee.org/stamp/stamp.jsp?tp=&arnumber=9368800 (Year: 2020).*

(Continued)

*Primary Examiner* — Jeremiah L Avery
(74) *Attorney, Agent, or Firm* — Volpe Koenig

(57) ABSTRACT

An object of the invention is to enable usage of data based on terms concluded with a user, and achieves both promotion of usage of personal data and privacy protection related to the personal data. A data distribution intermediary device acquires personal data metadata and generates service usage data metadata based on terms of service related to distribution and usage of the personal data. Then, the data distribution intermediary device detects a difference between the personal data metadata and the service usage data metadata, determines a necessity of conversion processing of the personal data based on the difference between the metadata, and converts the personal data to corresponding service usage data based on the service usage data metadata when the personal data is determined to be necessary to be converted.

9 Claims, 16 Drawing Sheets

(56) References Cited

U.S. PATENT DOCUMENTS

| | | | |
|---|---|---|---|
| 11,551,486 B1* | 1/2023 | Everett | G07C 5/0858 |
| 2017/0255966 A1* | 9/2017 | Khoury | B60W 40/00 |
| 2018/0046753 A1* | 2/2018 | Shelton | G16H 80/00 |
| 2019/0034716 A1* | 1/2019 | Kamarol | G06V 10/764 |
| 2019/0171832 A1* | 6/2019 | Dowlatkhah | G06F 21/6218 |
| 2019/0377900 A1* | 12/2019 | Balzer | G06F 21/6245 |
| 2020/0234515 A1* | 7/2020 | Gronsbell | H04Q 9/00 |
| 2021/0064780 A1* | 3/2021 | Riedel | G06Q 20/0655 |
| 2021/0150052 A1* | 5/2021 | Garcia | G06Q 50/18 |
| 2021/0192651 A1* | 6/2021 | Groth | G06Q 30/0206 |
| 2021/0192652 A1* | 6/2021 | Blaikie, III | G06F 16/245 |
| 2021/0232700 A1* | 7/2021 | Sahib | G06F 16/24564 |
| 2021/0312020 A1* | 10/2021 | Lindeman | H04L 9/3273 |
| 2021/0328973 A1* | 10/2021 | Sarkissian | G06F 21/6245 |
| 2021/0390080 A1* | 12/2021 | Tripathi | G06F 21/62 |
| 2022/0113148 A1* | 4/2022 | Ventimiglia | H04L 67/125 |
| 2022/0114212 A1* | 4/2022 | Ventimiglia | G06V 20/56 |
| 2022/0139535 A1* | 5/2022 | Kushnir | G16H 50/70 705/2 |
| 2022/0327226 A1* | 10/2022 | Rich | G06Q 30/04 |
| 2022/0350878 A1* | 11/2022 | Naujok | G06Q 30/0185 |
| 2023/0025790 A1* | 1/2023 | Shelton, IV | G06F 3/167 |

OTHER PUBLICATIONS

Prabavathy, B. et al. Multi-index technique for metadata management in private cloud storage. 2013 International Conference on Recent Trends in Information Technology. https://ieeexplore.ieee.org/stamp/stamp.jsp?tp=&arnumber=6844185 (Year: 2013).*

Choi, Hoan-Suk et al. Trusted cross-domain metadata model for context aware services. 2017 Ninth International Conference on Ubiquitous and Future Networks. https://ieeexplore.ieee.org/stamp/stamp.jsp?tp=&arnumber=7993805 (Year: 2017).*

Extended European Search Report dated Dec. 9, 2022 for European Patent Application No. 22181372.8.

* cited by examiner

FIG. 4

PERSONAL DATA (VEHICLE TRAVELING DATA) 401

```
{
    "timestamp" : 1560000000,
    "latitude" : 3538.98,
    "longitude" : 13939.6,
    "speed" : 57.96,
    "brake" : 0
},
```

- 401a — "timestamp"
- 401b — "latitude"
- 401c — "longitude"
- 401d — "speed"
- 401e — "brake"

STEADY STATE

SERVICE USAGE DATA (VEHICLE TRAVELLING DATA) 402

EMERGENCY STATE

SERVICE USAGE DATA (VEHICLE TRAVELLING DATA) 402

FIG. 6

TERMS-OF-SERVICE TABLE 421

| TERM ID (421a) | TERM NAME (421b) | TERM CONTENT (421c) |
|---|---|---|
| A1 | SERVICE OUTLINE | ACCIDENT EMERGENCY NOTIFICATION SERVICE |
| A2 | PROVIDER | COMPANY A |
| A3 | USAGE DATA | NAME<br>VEHICLE UNIQUE ID<br>VEICHLE TRAVELLING DATA<br>INQUIRY DESTINATION DATA<br>… |
| A4 | DATA ACQUISITION METHOD | • REGULARLY ACQUIRE DATA EVERY 200 MILLISECONDS IN STEADY STATE<br>• REGULARLY ACQUIRE DATA EVERY 50 MILLISECONDS IN EMERGENCY STATE |
| A5 | USAGE PURPOSE | ACCIDENT SUPPORT SERVICE |
| A6 | PROCESSING AND USAGE | • IN STEADY STATE, ANONYMOUSLY PROCESS POSITION INFORMATION DATA INTO AREA CODE INFORMATION, AND COLLECT ONLY POSITION INFORMATION AND MINIMUM DATA NECESSARY FOR SAFETY CONFIRMATION OF VEHICLE IN TIMESTAMP DATA.<br>• IN EMERGENCY STATE, COLLECT DATA IDENTIFYING DETAILED POSITION, SUCH AS LATITUDE AND LONGITUDE AND ROAD ID WITHOUT ANONYMOUSLY PROCESSING POSITION INFORMATION DATA, AND COLLECT VEHICLE TRAVELING DATA NECESSARY FOR ACCIDENT VERIFICATION INCLUDING POSITION INFORMATION, TIMESTAMP DATA, VEHICLE TRAVELING SPEED, BRAKE PRESENCE AND ABSENCE INFORMATION, AND ACCELERATION AND DECELERATION INFORMATION.<br>• COLLECT INQUIRY DESTINATION INFORMATION IN A CONCEALED MANNER REGARDLESS OF WHETHER VEHICLE IS IN STEADY STATE OR EMERGENCY STATE. REGRADING ADDRESS, COLLECT INFORMATION ON DISTRICTS, CITIES, TOWNS, AND VILLAGES IN STEADY STATE, AND COLLECT INFORMATION INCLUDING HOUSE NUMBERS AND BUILDINGS IN EMERGENCY STATE. |
| A7 | PROVISION TO THIRD PARTY | NONE |
| A8 | STORAGE PERIOD | UNTIL SERVICE CANCELLATION |
| A9 | INVOLVEMENT OF INDIVIDUAL | DISCLOSURE, USAGE STOP, CORRECTION, DELETION, RETRACTION OF CONSENT |
| A10 | INQUIRY DESTINATION | TELEPHONE NUMBER: XX-XX-XX<br>MAIL: XX@compay A.com<br>ADDRESS: XX1-1, XX-KU, TOKYO |

FIG. 7

PERSONAL DATA (VEHICLE TRAVELLING DATA) METADATA 411

```
{
    "VEHICLE DATA TIMESTAMP DATA": {           411a
        "EXPRESSION METHOD": "UNIX time"
    },
    "VEHICLE POSITION DATA": {                 411b
        "EXPRESSION METHOD": "LATITUDE AND LONGITUDE"
        "BASE N": 10,
    },
    "VEHICLE TRAVELING SPEED DATA": {          411c
        "UNIT": "km/h"
    },
    ...
}
```

FIG. 8

SERVICE USAGE DATA (VEHICLE TRAVELLING DATA) METADATA 412

```
"SERVICE SCENARIO LIST"[
  "STEADY STATE": {
    "VEHICLE DATA TIMESTAMP DATA": {
        "EXPRESSION METHOD": "UTC TIME"
    },
    "VEHICLE POSITION DATA": {
        "EXPRESSION METHOD": "AREA CODE",
        "BASE N": null,
    },
    ...
  }
  "EMERGENCY STATE": {
    "VEHICLE DATA TIMESTAMP DATA": {
        "EXPRESSION METHOD": "UTC TIME"
    },
    "VEHICLE POSITION DATA": {
        "EXPRESSION METHOD": "LATITUDE AND LONGITUDE"
        "BASE N": 10,
    },
    "VEHICLE TRAVELLING SPEED DATA": {
        "UNIT": "m/sec"
    },
    ...
  }
]
```

- 412A — "SERVICE SCENARIO LIST"[
- 412A1 — "STEADY STATE"
- 412A1a — "VEHICLE DATA TIMESTAMP DATA"
- 412A1b — "VEHICLE POSITION DATA"
- 412A2 — "EMERGENCY STATE"
- 412A2a — "VEHICLE DATA TIMESTAMP DATA"
- 412A2b — "VEHICLE POSITION DATA"
- 412A2c — "VEHICLE TRAVELLING SPEED DATA"

FIG. 9

DATA DISTRIBUTION CONTROL DATA   431

```xml
<?xml version="1.0" encoding="UTF-8"?>
<Request xmlns="urn:oasis:names:tc:xacml:3.0:core:schema:wd-17" CombinedDecision="false" ReturnPolicyIdList="true">
  <Attributes Category="urn:oasis:names:tc:xacml:1.0:subject-category:access-subject">
    <Attribute AttributeId="urn:oasis:names:tc:xacml:2.0:subject:role" IncludeInResult="false">
      <AttributeValue DataType="http://www.w3.org/2001/XMLSchema#string">serviceProvider</AttributeValue>
    </Attribute>
  </Attributes>
  <Attributes Category="urn:oasis:names:tc:xacml:3.0:attribute-category:resource">
    <Attribute AttributeId="urn:oasis:names:tc:xacml:1.0:resource:resource-id" IncludeInResult="false">
      <AttributeValue DataType="http://www.w3.org/2001/XMLSchema#string">vehicle</AttributeValue>
    </Attribute>
  </Attributes>
  <Attributes Category="urn:oasis:names:tc:xacml:3.0:attribute-category:action">
    <Attribute AttributeId="urn:oasis:names:tc:xacml:1.0:action:action-id" IncludeInResult="false">
      <AttributeValue DataType="http://www.w3.org/2001/XMLSchema#string">GET</AttributeValue>
    </Attribute>
  </Attributes>
</Request>
```

FIG. 10

SCRIPT MANAGEMENT TABLE 442

| DATA ID | BEFORE-CONVERSION ATTRIBUTE | AFTER-CONVERSION ATTRIBUTE | CONVERSION SCRIPT |
|---|---|---|---|
| | 442a | 442b | 442c | 442d |
| D100 (VEHICLE DATA TIMESTAMP) | Unix TIME | UTC TIME | ScriptA |
| D200 (VEHICLE POSITION DATA) | LATITUDE AND LONGITUDE | AREA CODE | ScriptB |
| D300 (VEHICLE TRAVELLING POSITION DATA) | UNIT km/h | UNIT m/sec | ScriptC |
| ... | ... | ... | ... |

FIG. 13

PRIVACY RANK DATA    423

| PRIVACY RANK | VEHICLE POSITION DATA |
|---|---|
| 1 | COUNTRY CODE |
| 2 | PREFECTURE CODE |
| 3 | AREA CODE |
| 4 | LATITUDE AND LONGITUDE |
| 5 | ROAD ID + ROAD SECTION ID + LATITUDE AND LONGITUDE |

FIG. 14

TERMS-OF-SERVICE TABLE 421

| TERM ID (421a) | TERM NAME (421b) | TERM CONTENT (421c) |
|---|---|---|
| A1 | SERVICE OUTLINE | ACCIDENT EMERGENCY NOTIFICATION SERVICE |
| A2 | PROVIDER | COMPANY A |
| A3 | USAGE DATA | NAME<br>VEHICLE UNIQUE ID<br>VEICHLE TRAVELLING DATA<br>INQUIRY DESTINATION DATA<br>... |
| A4 | DATA ACQUISITION METHOD | • REGULARLY ACQUIRE DATA EVERY 200 MILLISECONDS IN STEADY STATE<br>• REGULARLY ACQUIRE DATA EVERY 50 MILLISECONDS IN EMERGENCY STATE |
| A5 | USAGE PURPOSE | ACCIDENT SUPPORT SERVICE |
| A6 | PROCESSING AND USAGE | • IN STEADY STATE, ANONYMOUSLY PROCESS POSITION INFORMATION DATA FROM PRIVACY RANK 4 TO PRIVACY RANK 3, AND COLLECT ONLY POSITION INFORMATION AND MINIMUM DATA NECESSARY FOR SAFETY CONFIRMATION OF VEHICLE IN TIMESTAMP DATA.<br>• IN EMERGENCY STATE, COLLECT VECHILE TRAVELLING DATA NECESSARY FOR ACCIDENT VERIFICATION INCLUDING POSITION INFORMATION, TIMESTAMP DATA, VEHICLE TRAVELING SPEED, BRAKE PRESENCE AND ABSENCE INFORMATION, AND ACCELERATION AND DECELERATION INFORMATION WITHOUT ANONYMOUSLY PROCESSING POSITION INFORMATION DATA.<br>• COLLECT INQUIRY DESTINATION INFORMATION IN A CONCEALED MANNER REGARDLESS OF WHETHER VEHICLE IS IN STEADY STATE OR EMERGENCY STATE. REGRADING ADDRESS, COLLECT INFORMATION OF PRIVACY RANK 3 IN STEADY STATE, AND COLLECT INFORMATION OF PRIVACY RANK 2 IN EMERGENCY STATE. |
| A7 | PROVISION TO THIRD PARTY | NONE |
| A8 | STORAGE PERIOD | UNTIL SERVICE CANCELLATION |
| A9 | INVOLVEMENT OF INDIVIDUAL | DISCLOSURE, USAGE STOP, CORRECTION, DELETION, RETRACTION OF CONSENT |
| A10 | INQUIRY DESTINATION | TELEPHONE NUMBER: XX-XX-XX<br>MAIL: XX@compay A.com<br>ADDRESS: XX1-1, XX-KU, TOKYO |

*FIG. 15*

SCRIPT MANAGEMENT TABLE 442

| DATA ID | BEFORE-CONVERSION ATTRIBUTE | AFTER-CONVERSION ATTRIBUTE | CONVERSION SCRIPT |
|---|---|---|---|
| D100 (VEHICLE DATA TIMESTAMP) | Unix TIME | UTC TIME | ScriptA |
| D200 (VEHICLE POSITION DATA) | PRIVACY RANK 4 | PRIVACY RANK 3 | ScriptB |
| D300 (VEHICLE TRAVELLING POSITION DATA) | UNIT km/h | UNIT m/sec | ScriptC |
| ... | ... | ... | ... |

442a    442b    442c    442d

DATA DISTRIBUTION INTERMEDIARY DEVICE AND DATA DISTRIBUTION INTERMEDIARY METHOD

BACKGROUND OF THE INVENTION

1. Field of the Invention

The present invention relates to a data distribution intermediary device and a data distribution intermediary method, and particularly relates to a data distribution intermediary device and a data distribution intermediary method that enable usage of data based on terms between a user and a service provider that performs services based on personal data and that are suitable for use in an application that achieves both promotion of usage of the personal data and privacy protection related to the personal data.

2. Description of the Related Art

In recent years, in order to provide services for corporations and individuals in each company, discussions and studies for distributing and utilizing various types of data including collected personal data across companies and industries have become active. In particular, regarding personal data, as represented by a general data protection regulation (GDPR) of the EU, which is a law related to privacy protection, importance and a mechanism for an individual user, who is a master of data, to control his/her personal data have been studied. At this time, it is difficult for the individual user to control all data, and thus a model has attracted attention. In the model, a system (data distribution intermediary system) serving as a mediator of data distribution such as an information bank or a personal data store (PD) is installed as an independent organization different from a company serving as a data user and an individual serving as a data master, and the data distribution and management of data and procedures for the data distribution are supported. At this time, a difference in content may exist between data collected and stored by a data provider and data handled by a service provider that provides a new service to a user, which is one of problems to be solved in realizing the data distribution.

For example, JP-A-2020-129311 (Patent Literature 1) is provided as a related art relating to data distribution using a data distribution intermediary system. Patent Literature 1 discloses a system related to data distribution control for activating the data distribution by introducing a mechanism of giving an incentive to an individual who is a data master, a data mediator, and a data provider. In addition, Patent Literature 1 discloses that during the data distribution, the data provider converts the data into a predetermined data form and transmits the data to a data distribution intermediary system (paragraphs [0066] and [0128]).

It is described that in the system related to the data distribution control disclosed in Patent Literature 1, a server of a data provision company converts a format of data into a designated format when the format as a provision condition is designated in a provision request. Patent Literature 1 only discloses the conversion of the data format by the data provider and does not specifically mention a method for converting data content. Here, the data format refers to a data format such as Comma Separated Value (CSV) and eXtensible Markup Language (XML), and the data content does not change even when the data format is converted. In addition, Patent Literature 1 does not specify conversion processing for service content provided by a service provider and data content dynamically changed in accordance with a data specification that the data provider holds, and a method for determining necessity of conversion for the conversion processing.

Therefore, provision of data by the data provider based on terms to which a user (owner of personal data) consents and provision of data after processing in accordance with change in situations are not considered. For example, in a normal state, protection of user privacy may be set strict; in an emergency state, since privacy protection is loosened to use data, security improvement and public data use may be desired.

SUMMARY OF THE INVENTION

An object of the invention is to provide a data distribution intermediary system that enables usage of data based on terms between a user and a service provider that performs services based on personal data, and that can achieve both promotion of usage of the personal data and privacy protection related to the personal data.

A configuration of the data distribution intermediary device according to the invention is preferably a data distribution intermediary device for mediating data exchange between a data provision device of a data provider that collects and provides personal data provided by a data owner and a data usage device of a service provider that provides service usage data related to the personal data. The data distribution intermediary device includes: a personal data metadata management unit configured to acquire personal data metadata that is metadata of the personal data stored in the data provision device; a service usage data attribute management unit configured to generate service usage data metadata, which is metadata related to the service usage data, based on terms of service related to distribution and usage of the personal data; a metadata attribute difference detection unit configured to detect a difference between the personal data metadata and the service usage data metadata; a personal data conversion determination unit configured to determine a necessity of conversion processing of the personal data based on the difference of the metadata detected by the metadata attribute difference detection unit; and a personal data conversion processing unit configured to convert the personal data to corresponding service usage data. The necessity of conversion of the personal data is determined by the personal data conversion determination unit, and when the personal data is determined to be necessary to be converted, the personal data conversion processing unit converts the personal data to the service usage data based on the service usage data metadata.

According to the invention, it is possible to provide a data distribution intermediary system that enables usage of data based on terms between a user and a service provider that performs services based on personal data, and that can achieve both promotion of usage of the personal data and privacy protection related to the personal data.

BRIEF DESCRIPTION OF THE DRAWINGS

FIG. 4 is a diagram showing an example of personal data provided by a data provision device to the data distribution intermediary device.

FIG. 6 is a diagram showing an example of a terms-of-service table according to the first embodiment.

FIG. 7 is a diagram showing an example of personal data metadata.

FIG. 8 is a diagram showing an example of service usage data metadata.

FIG. 9 is a diagram illustrating an example of data distribution control data.

FIG. 10 is a diagram showing an example of a script management table according to the first embodiment.

FIG. 13 is a diagram showing an example of privacy rank data.

FIG. 14 is a diagram showing an example of a terms-of-service table according to the second embodiment.

FIG. 15 is a diagram showing an example of a script management table according to the second embodiment.

DESCRIPTION OF THE PREFERRED EMBODIMENTS

Hereinafter, embodiments according to the invention will be described with reference to FIGS. 1 to 15.

First Embodiment

Hereinafter, a first embodiment according to the invention will be described with reference to FIGS. 1 to 11B.

First, a configuration of a data distribution intermediary system according to the first embodiment of the invention will be described with reference to FIGS. 1 to 3.

First, a schematic configuration of the data distribution intermediary system will be described with reference to FIG. 1.

Figure 1:
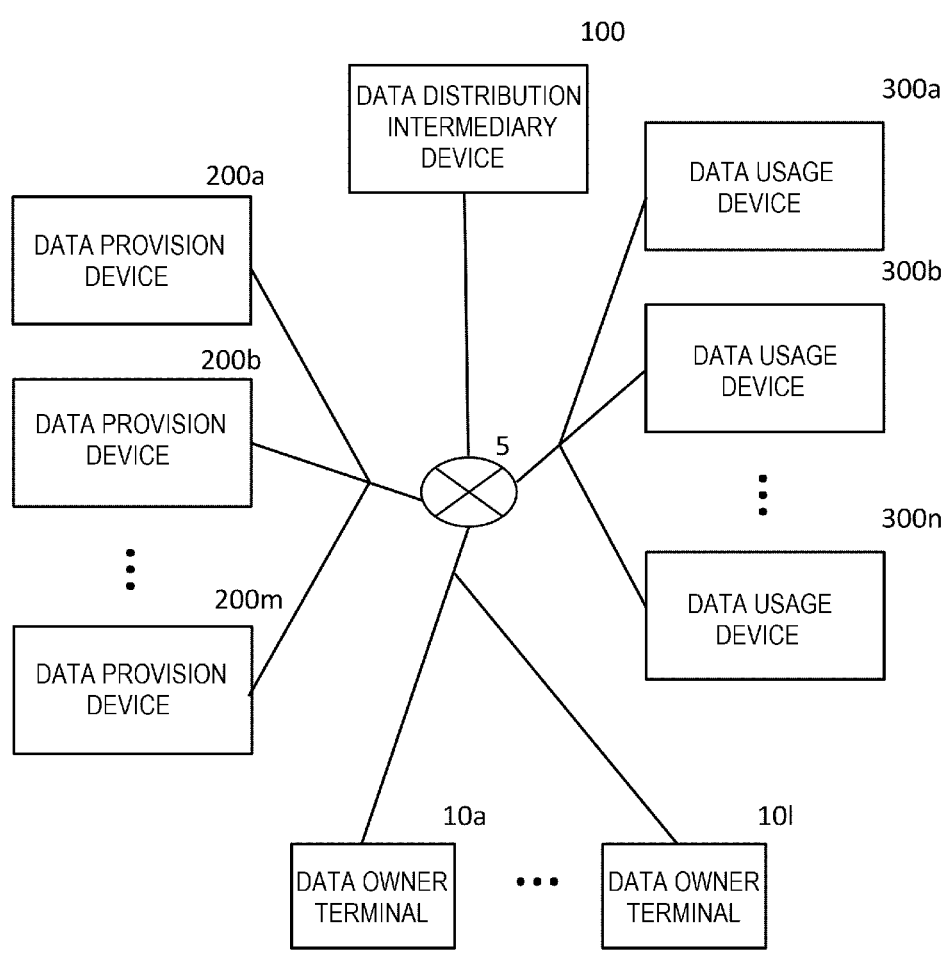
FIG. 1 is a schematic configuration diagram of a data distribution intermediary system.

As shown in FIG. 1, in the data distribution intermediary system, a data distribution intermediary device 100, a data provision device 200 (denoted as data provision devices 200a, 200b, . . . , and 200m in FIG. 1), a data usage device 300 (denoted as data usage devices 300a, 300b, . . . , and 300n in FIG. 1), and a data owner terminal 10 (denoted as data owner terminals 10a, 10b, . . . , and 101 in FIG. 1) are connected to one another via a network 5. The network 5 may be wired or wireless, may be a global network such as the Internet, or may be a local area network (LAN). In addition, the data distribution intermediary device 100, the data provision device 200, the data usage device 300, and the data owner terminal 10 may be individually connected to the network.

The data distribution intermediary device 100 is a device that mediates data distribution between the data provision device 200 and the data usage device 300 and performs conversion and selection of data as necessary. The data provision device 200 is a device that provides data of a data owner (personal data, details of which will be described later) to the data usage device 300. The data usage device 300 is a device that receives service usage data (details will be described later) from the data provision device 200 and uses the service usage data for a service. The data owner terminal 10 is a device for the data owner to upload settings related to data, consent to terms related to the data usage with a data provider or a data user, and the personal data to the data provision device 200. The personal data may be provided to the data provision device 200 not only by being uploaded from the data owner terminal 10 but also via another path.

In the description of the present embodiment, an emergency notification service system in an automobile road will be mainly described as an example. An emergency notification service refers to a service in which, when an automobile accident occurs on an automobile road, an emergency notification provider grasps a situation based on vehicle data and requests an ambulance or the like in accordance with the situation. In this case, the data owner is a driver of an automobile, and examples of the personal data include accident damage situation data and personal medical data of the driver of the automobile (blood group, allergy, and past medical history). When the personal data is the accident damage situation data, the data provider is an automobile maker, and the data user is a road service provider such as police, an insurance company, a hospital, and JAF. When the personal data is the personal medical data, the data provider is a hospital in association with the driver, and data users are an insurance company and a hospital to which the driver of the automobile is carried at the time of the accident.

The data owner terminal 10 may be implemented by dedicated hardware, or may be implemented by a central processing unit (CPU), a memory, and the like, and may implement a function thereof by the CPU executing computer programs for implementing functions of units. For example, the data owner terminal 10 may be a mobile communication terminal device such as a smartphone, a car navigation system of an automobile, or a smart device incorporated in a vehicle to collect drive information, or may be a stationary communication terminal (for example, a personal computer).

Next, a functional configuration of the data distribution intermediary device will be described with reference to FIG. 2.

Figure 2:
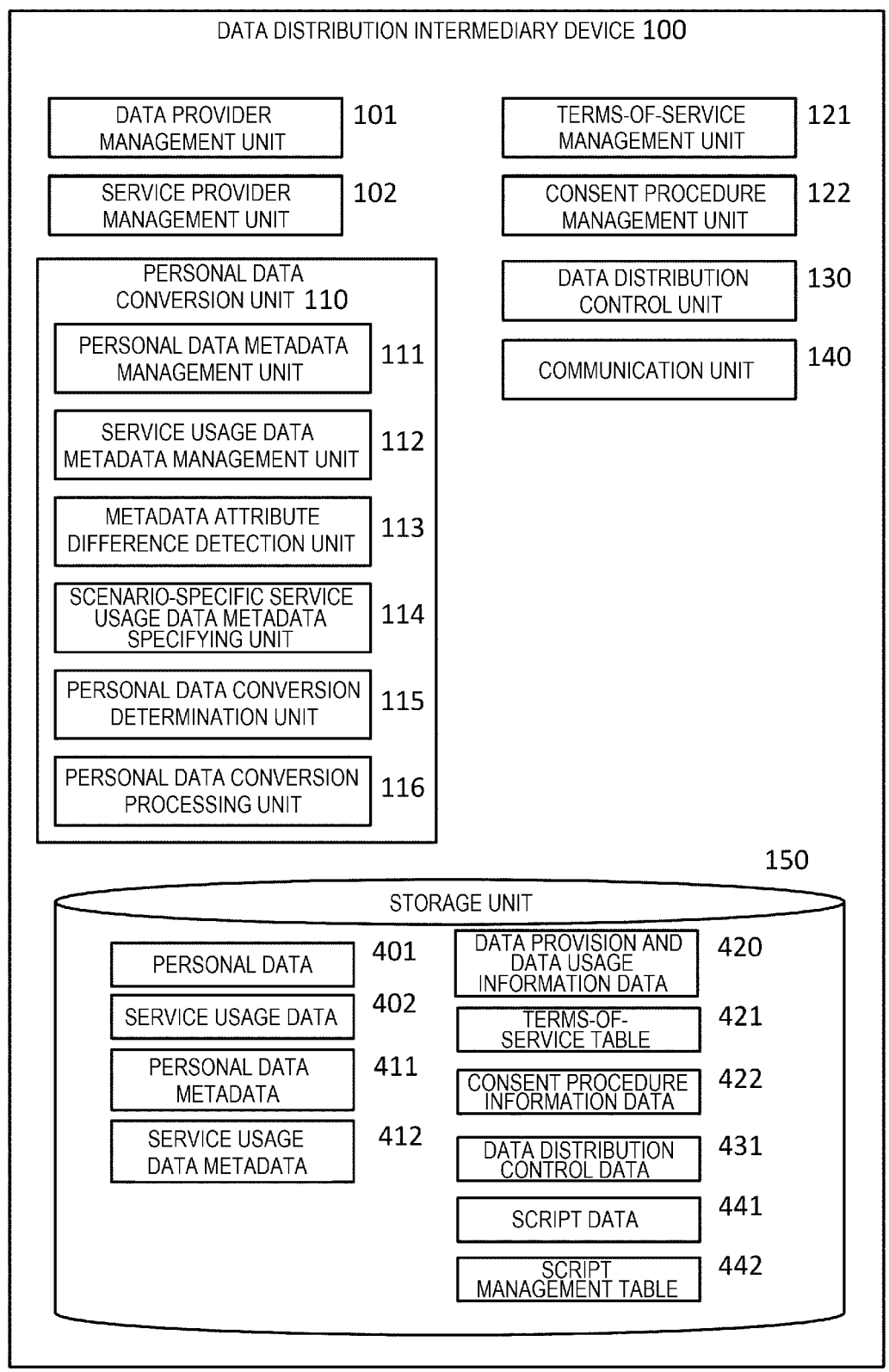
FIG. 2 is a functional configuration diagram of a data distribution intermediary device according to a first embodiment.

As shown in FIG. 2, the data distribution intermediary device 100 includes a data provider management unit 101, a service provider management unit 102, a personal data conversion unit 110, a terms-of-service management unit 121, a consent procedure management unit 122, a data distribution control unit 130, a communication unit 140, and a storage unit 150.

The data provider management unit 101 is a functional unit that manages information on a data provider, who provides data using the data provision device 200, and personal data provided using the data provision device 200.

The service provider management unit 102 is a functional unit that manages, through the data owner terminal 10, various types of information related to a service used by a user, that is, service content, information on a provider providing the service, a use state of the service, and the like.

The personal data conversion unit 110 is a functional unit that determines, when performing control of distribution of personal data of the user collected and accumulated by the data provision device 200 to the data usage device 300, whether it is necessary to convert content of the personal data of the user, and performs conversion processing when necessary.

The personal data conversion unit 110 includes subfunctional units of a personal data metadata management unit 111, a service usage data metadata management unit 112, a metadata attribute difference detection unit 113, a scenario-specific service usage data metadata specifying unit 114, a personal data conversion determination unit 115, and a personal data conversion processing unit 116.

The personal data metadata management unit 111 is a functional unit that acquires metadata of the personal data of the user collected and accumulated by the data provision device 200 (hereinafter, simply referred to as "personal data metadata", and details thereof will be described later) from the data provision device 200 and manages the personal data metadata.

The service usage data metadata management unit 112 is a functional unit that manages metadata related to the personal data of the user used in the service (hereinafter, simply referred to as "service usage data metadata" and details thereof will be described later).

The service usage data metadata is metadata generated based on service terms information, which includes collection, accumulation, and usage application of the personal data of the user and is managed by the terms-of-service management unit 121, and based on a consent result of the user managed by the consent procedure management unit 122. The service usage data metadata management unit 112 can manage metadata of personal data of each user corresponding to a service customized for the user (data used in the service differs for each user). In addition, metadata related to the personal data of the user, which is used in the service and generated by the service provider or the data usage device 300, may be acquired and managed even if the service usage data metadata is not generated in the data distribution intermediary device 100. In addition, the service usage data metadata may be generated by an operator or manager of the data distribution intermediary device 100.

The metadata attribute difference detection unit 113 is a functional unit that detects a difference between the personal data metadata managed by the personal data metadata management unit 111 and the service usage data metadata managed by the service usage data metadata management unit 112. The detection of the difference by the metadata attribute difference detection unit 113 is performed based on specific attributes of metadata (metadata attributes) in the personal data metadata and the service usage data metadata, and is implemented by detecting a difference between setting values of the metadata attributes.

The scenario-specific service usage data metadata specifying unit 114 is a functional unit that specifies service usage data metadata to be used for each scenario (details thereof will be described later) of the service provided by the service provider.

The personal data conversion determination unit 115 is a functional unit that determines whether it is necessary to convert the personal data of the user collected and accumulated by the data provision device 200, based on the difference between the setting values of the metadata attributes that is detected by the metadata attribute difference detection unit 113.

The personal data conversion processing unit 116 is a functional unit that performs appropriate conversion processing based on setting of a personal data metadata attribute and setting a service usage data metadata attribute when the personal data conversion determination unit 115 determines that it is necessary to convert the personal data of the user.

The terms-of-service management unit 121 is a functional unit that acquires, from the data usage device 300, terms of service for a service agreed between the user and the service provider with respect to the service that is provided by the data usage device 300 and that is desired to be used by the user, confirms whether a deficiency exists, and manages terms to be disclosed to the user.

The consent procedure management unit 122 is a functional unit that generates a consent request notification to be transmitted to the data owner terminal 10 based on the terms of service for the service of the service provider, determines whether the user receiving the notification gives his/her consent using the data owner terminal 10, and acquires and manages a consent result of the user.

The data distribution control unit 130 controls a data flow for distributing, to the data usage device 300 based on data distribution control data (details will be described later), personal data of the user collected and accumulated by the data provision device 200 based on the terms of service for the service that are consented to by the user and that are managed by the consent procedure management unit 122.

The communication unit 140 is a functional unit that performs communication with the data provision device 200, the data usage device 300, and the data owner terminal 10 via the network 5. For example, the communication unit 140 receives, from the data usage device 300, terms of service for a service that is desired to be used by the user, and transfers the terms of service to the terms-of-service management unit 121. In addition, the communication unit 140 transmits terms of service for a service received by the terms-of-service management unit 121 to the data owner terminal 10, performs communication for requesting consent to the terms of service for the service, and receives a consent result from the data owner terminal 10.

The storage unit 150 is a functional unit that stores data generated or to be used when the data provider management unit 101, the service provider management unit 102, the personal data conversion unit 110, the terms-of-service management unit 121, the consent procedure management unit 122, and the data distribution control unit 130 implement respective functions.

The storage unit 150 stores personal data 401, service usage data 402, personal data metadata 411, service usage data metadata 412, data provision and data usage information data 420, a terms-of-service table 421, consent procedure information data 422, data distribution control data 431, script data 441, and a script management table 442. Details of each type of data will be described below.

Next, a hardware and software configuration of the data distribution intermediary device will be described with reference to FIG. 3.

Figure 3:
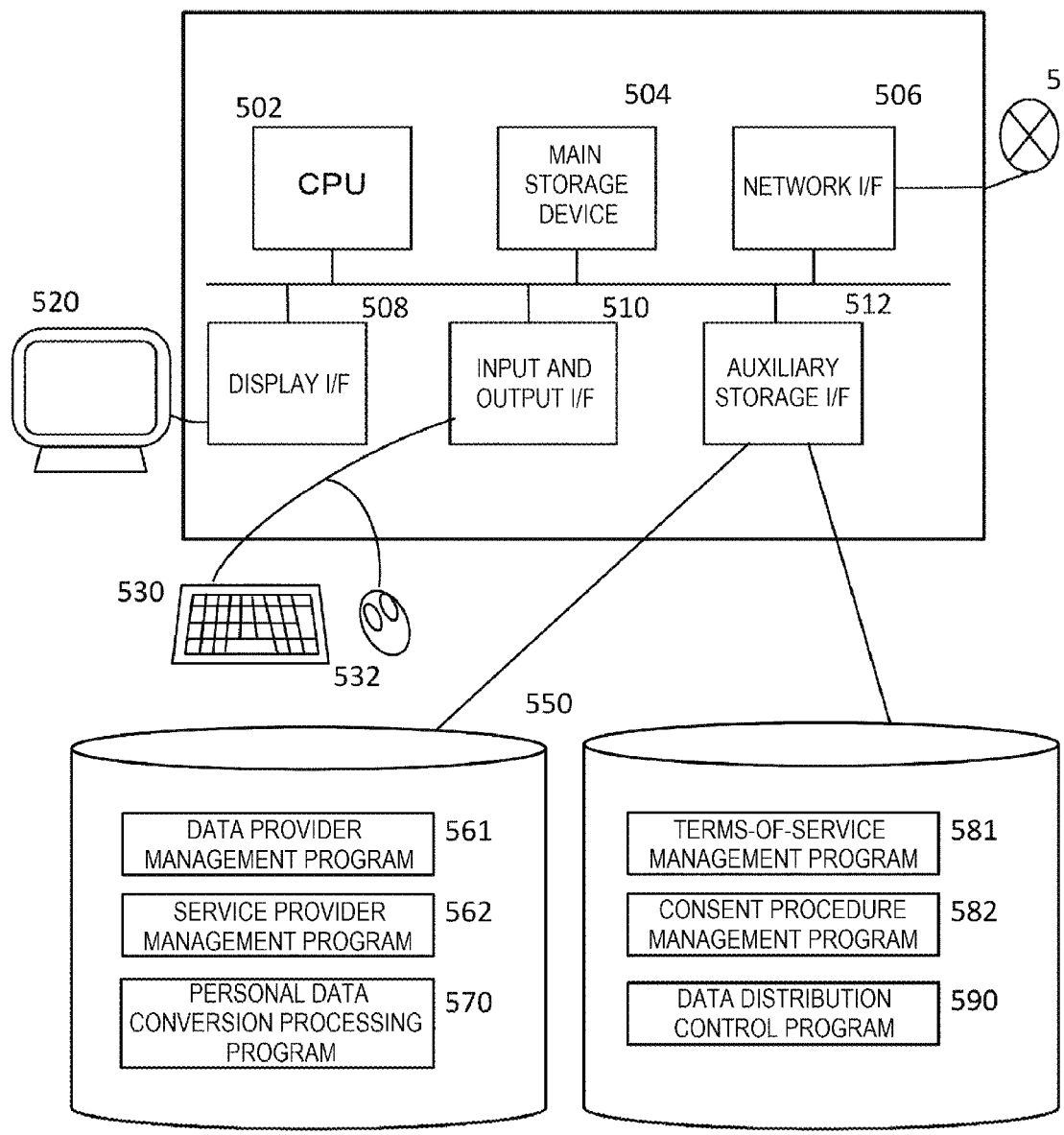
FIG. 3 is a hardware and software configuration diagram of the data distribution intermediary device.

The hardware configuration of the data distribution intermediary device 100 is implemented by, for example, a general information processing device such as a personal computer shown in FIG. 3.

In the data distribution intermediary device 100, a central processing unit (CPU) 502, a main storage device 504, a network interface (I/F) 506, a display I/F 508, an input and output I/F 510, and an auxiliary storage I/F 512 are connected by a bus.

The CPU 502 controls each unit of the data distribution intermediary device 100, loads necessary programs into the main storage device 504, and executes the programs.

The main storage device 504 is usually implemented by a volatile memory such as a RAM, and stores programs to be executed by the CPU 502 and data to be referred to.

The network I/F 506 is an interface for connecting to the network 5.

The display I/F 508 is an interface for connecting a display device 520 such as a liquid crystal display (LCD).

The input and output I/F 510 is an interface for connecting an input and output device. In the example of FIG. 3, a keyboard 530 and a mouse 532 of a pointing device are connected to the input and output I/F 510.

The auxiliary storage I/F 512 is an interface for connecting an auxiliary storage device such as a hard disk drive (HDD) 550 or a solid state drive (SSD).

The HDD 550 has a large storage capacity and stores programs for implementing the present embodiment. A data provider management program 561, a service provider management program 562, a personal data conversion processing program 570, a terms-of-service management program 581, a consent procedure management program 582, and a data distribution control program 590 are installed in the data distribution intermediary device 100.

The data provider management program 561, the service provider management program 562, the personal data conversion processing program 570, the terms-of-service management program 581, the consent procedure management program 582, and the data distribution control program 590 are programs for implementing the functions of the data provider management unit 101, the service provider management unit 102, the personal data conversion unit 110, the terms-of-service management unit 121, the consent procedure management unit 122, and the data distribution control unit 130, respectively.

The HDD 550 stores the personal data 401, the service usage data 402, the personal data metadata 411, the service usage data metadata 412, the terms-of-service table 421, the consent procedure information data 422, the data distribution control data 431, and the script data 441, which are not shown.

In the embodiment described above, the data distribution intermediary device 100 is described as implementing the function thereof by the CPU executing the computer programs for the information processing device implementing the functions of the units, and may be implemented by a dedicated hardware.

Next, details of data used in the data distribution intermediary system will be described with reference to FIGS. 4 to 10.

The personal data 401 is personal data of a data owner that is collected by the data provision device 200 and that is provided to the data distribution intermediary device 100. FIG. 4 shows, as an example of the personal data 401, vehicle traveling data described in a JavaScript Object Notation (JSON) form as drive information of a vehicle of a data owner. In the example of FIG. 4, the vehicle traveling data includes a vehicle data timestamp 401*a*, vehicle position data (latitude) 401*b*, vehicle position data (longitude) 401*c*, vehicle traveling speed data 401*d*, and vehicle brake operation information 401*e*.

The service usage data 402 is data that is obtained by the data distribution intermediary device 100 converting the personal data 401 as necessary and that is to be provided to the data usage device 300.

In the example of the present embodiment, it is assumed that the personal data 401 is subjected to different conversions depending on scenarios of the service and is provided to the data usage device 300.

Figure 5A:
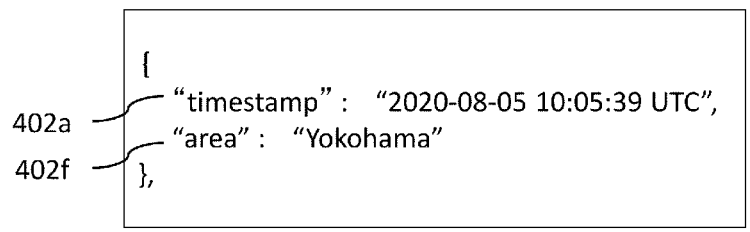
FIG. 5A is a diagram showing an example of service usage data provided by the data distribution intermediary device to a data usage device in a normal state.
Figure 5B:
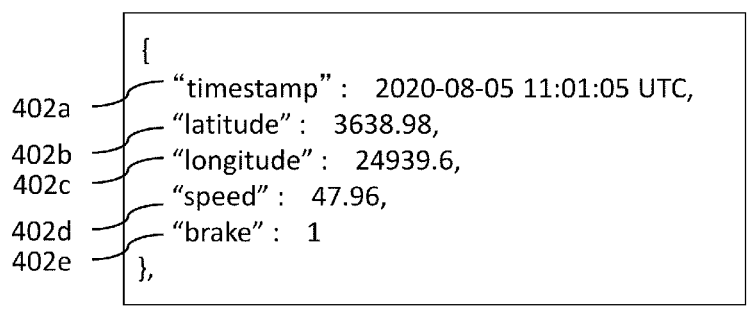
FIG. 5B is a diagram showing an example of service usage data provided by the data distribution intermediary device to the data usage device in an emergency state.

For example, in the example of FIGS. 5A and 5B, FIG. 5A shows data provided in a steady state in which no accident occurs when a data owner drives a vehicle, and FIG. 5B shows data provided in an emergency state in which an accident occurs when the data owner drives a vehicle.

The data provided in the steady state of FIG. 5A only includes vehicle data timestamp 402*a* and vehicle position data (area code) 402*f*. On the other hand, the data provided in the emergency state of FIG. 5B is more detailed data, and includes the vehicle data timestamp 402*a*, vehicle position data (latitude) 402*b*, vehicle position data (longitude) 402*c*, vehicle traveling speed data 402*d*, and vehicle brake operation information 402*e*. The service usage data of FIGS. 5A and 5B follows the terms-of-service table 421 (in particular, related to term IDs=A3, A4, and A6) to be described later.

The terms-of-service table 421 is a table for storing information on terms of service agreed between the data owner and the data provider or the data user, and includes fields of a term ID 421*a*, a term name 421*b*, and term content 421*c* as shown in FIG. 6. The term ID 421*a* stores an ID for uniquely identifying records of the terms of service. The term name 421*b* stores a name of the terms of service. The term content 421*c* stores a specific content of the terms of service.

Examples of the names of the terms of service as shown in FIG. 6 include a service outline, a provider, usage data, a data acquisition method, a usage purpose, processing and usage, provision to a third party, a storage period, personal involvement, and an inquiry destination.

An example of the terms-of-service table illustrated in FIG. 6 is a case where an accident emergency notification service is taken as an example, and the term content of "usage data" ("A3" of the term ID 421*a*) includes vehicle traveling data and the like. The term content of the term "data acquisition method" ("A4" of the term ID 421*a*) thereof varies depending on the steady state (accident occurrence absent) and the emergency state (accident occurrence present). An acquisition interval is shorter in the emergency state than that in the steady state. When a data collection interval from the data provision device 200 is 50 milliseconds as that in the emergency state, the data distribution intermediary device 100 provides the data usage device 300 with data thinned out therefrom in the steady state. As the term content of the term "processing and usage" ("A6" of the term ID 421*a*), in the steady state, position information data is anonymously processed into area code information, and only position information and minimum data necessary for safety confirmation of a vehicle in timestamp data are collected. In the emergency state, data for identifying a detailed position, such as latitude and longitude or a road ID, is collected without anonymously processing position information data, and vehicle traveling data necessary for accident verification is collected including position information, timestamp data, vehicle traveling speed, brake presence and absence information, and acceleration and deceleration information. Inquiry destination information is concealed and collected regardless of whether the vehicle is in the steady state or the emergency state.

As an example of the scenario of the service according to the present embodiment, in a case where a plurality of scenarios for providing a service are supported, which are shown as the steady state in which no accident occurs when the data owner drives a vehicle and the emergency state in which an accident occurs when the data owner drives a vehicle, it is necessary to describe this fact in the terms of service agreed between the data owner and the data provider or the data user.

The personal data metadata 411 is data that represents items of the personal data 401 and a description form thereof. The personal data metadata 411 of the present embodiment is metadata of the time when the personal data is the vehicle traveling data, and for example, includes a vehicle data timestamp data item 411*a*, a vehicle position data item 411*b*, and a vehicle traveling speed data item 411*c* in the JSON form as shown in FIG. 7.

The vehicle data timestamp data item 411*a* indicates that UNIX time is used as a method for expressing a vehicle data timestamp. The vehicle position data item 411*b* indicates that, as a method for expressing vehicle position data, the vehicle position data is represented by latitude and longitude, and base N is base 10 (decimal notation). The vehicle traveling speed data item 411*c* indicates that a unit of vehicle traveling speed data is km/h. Note that specific expression forms of metadata on the system may be other forms other than the JSON form shown in the present example.

The service usage data metadata 412 is data representing items of the service usage data 402 and a description form thereof. The service usage data metadata 412 of the present embodiment is metadata of the service usage data 402 obtained by converting the personal data when the personal data is vehicle traveling data, and as shown in FIG. 8, a plurality of pieces of metadata according to the scenario of the service are defined as a service scenario list 412A. In the example of FIG. 8, an example of metadata used in two types of scenarios is described, which are a steady state list 412A1 and an emergency state list 412A2 in the accident emergency notification service serving as lower-level lists of the service scenario list 412A.

The steady state list 412A1 at the head of the service scenario list 412A includes a vehicle data timestamp data item 412A1*a* and a vehicle position data item 412A1*b*. It is indicated that the UTC time is used as a method for expressing the vehicle data timestamp. In addition, it is indicated that a method for expressing the vehicle position data is representation by an area code, and the base N is NULL, that is, no base N expression is used.

The subsequent emergency state list 412A2 includes a vehicle data timestamp data item 412A2*a*, a vehicle position data item 412A2*b*, and a vehicle traveling speed data item 412A2*c*. It is indicated that the UTC time is used as a method for expressing the vehicle data timestamp. In addition, it is indicated that the method for expressing the vehicle position data is representation by latitude and longitude and the base N is base 10 (decimal notation). Furthermore, it is indicated that the unit of the vehicle traveling speed data is m/sec. By such a list, it is possible to define a plurality of pieces of metadata and switch metadata to be used for each scenario of the service. Note that the specific expression forms of the metadata on the system may be other forms other than the JSON form shown in the present example.

The data distribution control data 431 is data in which the data distribution control unit 130 describes a procedure and a data form for exchanging data with other components, and is, for example, data describing rules of data access control using an XML-based markup language such as eXtensible Access Control Markup Language (XACML) and describing information for controlling a data flow in accordance with the rules, as shown in FIG. 9. The description of the data distribution control data 431 may be in a description form other than XACML.

The script management table 442 is a table in which, for each data item, a pair of attributes of data before and after conversion and information on a script for implementing the conversion are described, and includes fields of a data ID 442*a*, a before-conversion attribute 442*b*, an after-conversion attribute 442*c*, and a conversion script 442*d* as shown in FIG. 10. The data ID 442*a* stores an ID for uniquely identifying records of data. The before-conversion attribute 442*b* stores an attribute before the conversion of the data of the data ID 442*a*. The after-conversion attribute 442*c* stores an attribute after the conversion of the data of the data ID 442*a*. The conversion script 442*d* stores a name or an ID of a script for implementing the conversion.

Although not shown, the data provision and data usage information data 420 is a network address and other logical information for the data distribution intermediary device 100 to use the data provision device 200 and the data usage device 300.

Although not shown, the consent procedure information data 422 is data related to information regarding consent of the data owner, such as whether the data owner consents to the terms of service, and a consent date and time.

Although not shown, the script data 441 is data that describes a script for converting the personal data 401 into the service usage data 402.

Next, a processing of the data distribution intermediary system will be described with reference to FIGS. 11A and 11B.

Figure 11A:
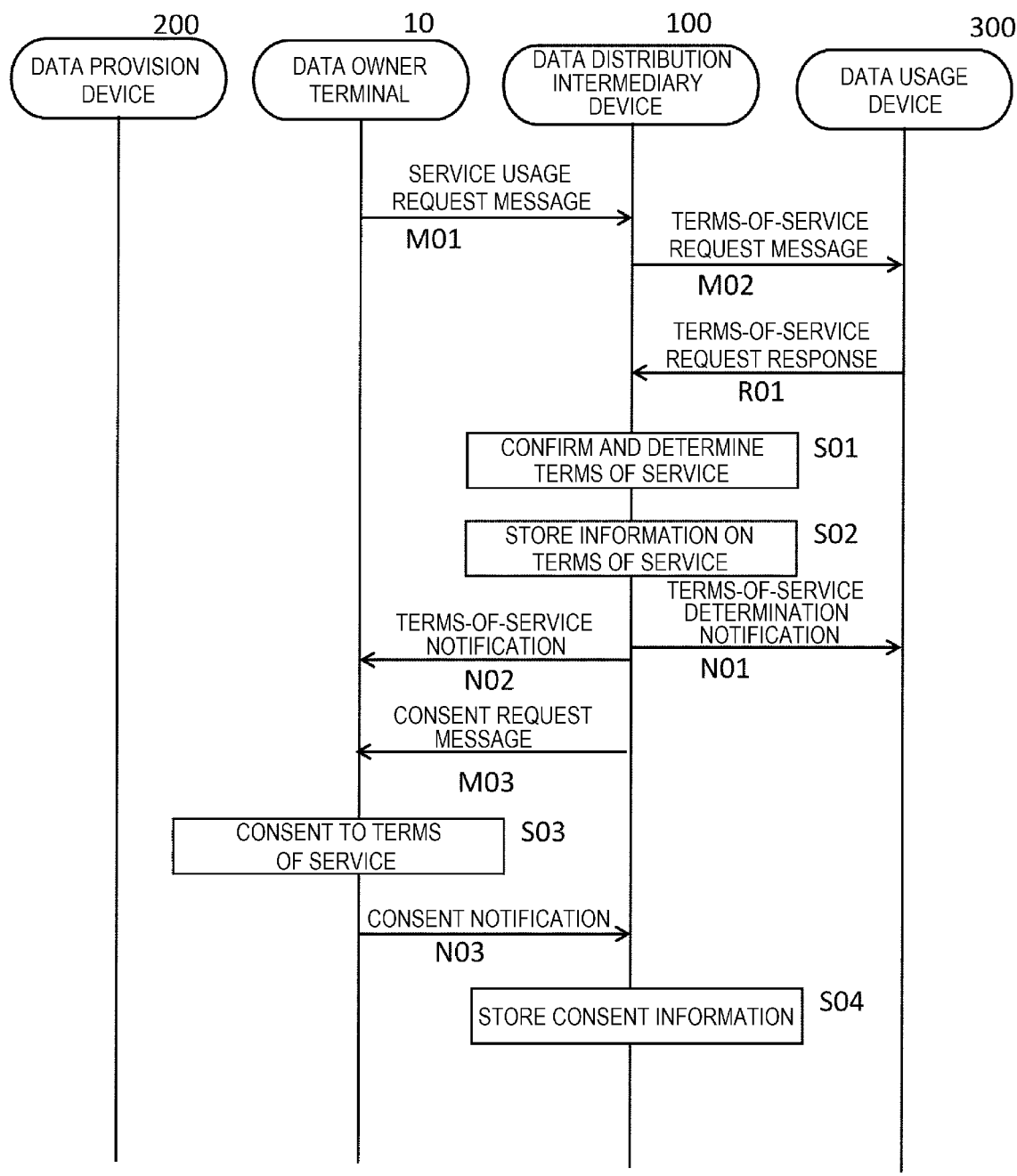
FIG. 11A is a sequence chart (first sequence chart) illustrating processing of the data distribution intermediary system.

First, the data owner terminal 10 transmits, in response to an operation of a user (data owner), a service usage request message M01 provided by the data usage device 300 to the data distribution intermediary device 100 (FIG. 11A). Although not shown, the service usage request message M01 is a message including a service ID, a user ID, and the like. Here, the service ID is an identifier for identifying a service provided by the data usage device 300, and the user ID is an identifier for identifying the user.

The data distribution intermediary device 100 receives the service usage request message M01 from the communication unit 140 and stores information related to the received service usage request message M01.

Next, information that associates the service ID with the data usage device 300 is defined in advance in the data provision and data usage information data 420. The data distribution intermediary device 100 transmits a terms-of-service request message M02 of a service ID included in the received service usage request message M01 to the data usage device 300 corresponding to the service ID by the communication unit 140.

The data usage device 300 receives the transmitted terms-of-service request message M02, and returns, to the data distribution intermediary device 100, a terms-of-service request response R01 including information on terms-of-service data corresponding to the service ID included in the received terms-of-service request message M02.

Here, the terms-of-service data corresponding to the service ID is data including information expressing terms of service determined by a service provider who provides the service corresponding to the service ID.

Next, the terms-of-service management unit 121 confirms whether a deficiency exists in the terms of service for the service in the terms-of-service data, corrects the terms of service for the service when a deficiency exists, determines terms to be disclosed to the user (S01), and stores information on the terms-of-service data as the terms-of-service table 421 shown in FIG. 6 (S02).

Then, the data distribution intermediary device 100 transmits, via the communication unit 140, a terms-of-service determination notification N01 to the data usage device 300 and a terms-of-service notification N02 including content of the terms of service for the service to the data owner terminal 10.

Next, the consent procedure management unit 122 transmits, to the data owner terminal 10, a consent request message M03 that requests the data owner consents to the transmitted terms of service for the service.

The data owner terminal 10 notifies the data owner of the content of the terms of service for the service and receiving of the consent request message M03, and displays the content of the received terms of service for the service and content of the consent request message M03 through a display screen. The data owner expresses an intention as to whether to consent to the terms of service for the service desired to be newly used based on the content of the terms of service for the service and the content of the consent request message M03 displayed on the display screen (S03). When the data owner consents to the terms of service, the data owner terminal 10 transmits a consent notification N03 to the data distribution intermediary device 100.

Next, the consent procedure management unit 122 acquires information on the consented service from the consent notification N03 via the communication unit 140, and stores, for example, which data owner consents to which terms of service for which service as the consent procedure information data 422 (S04).

Figure 11B:
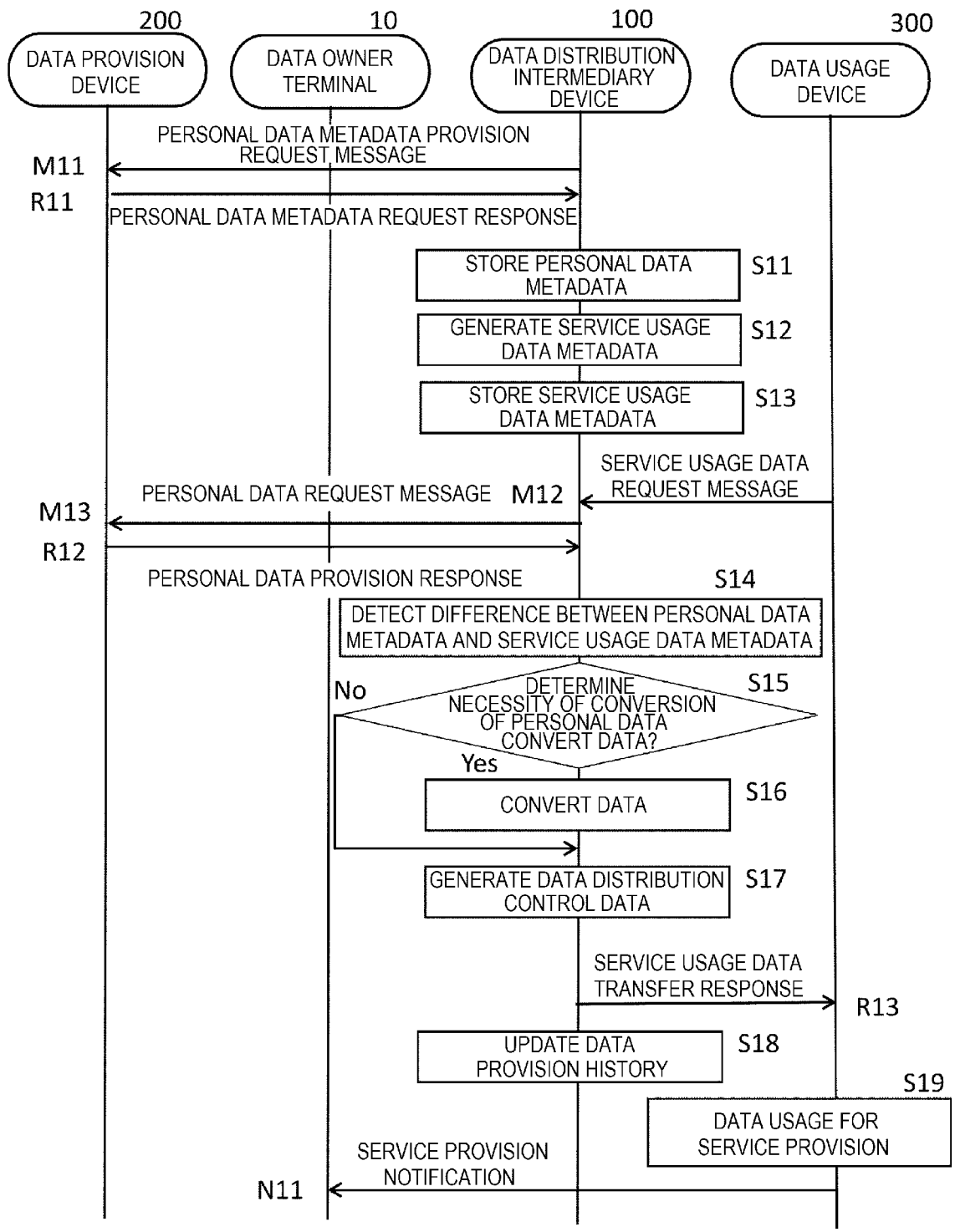
FIG. 11B is a sequence chart (second sequence chart) illustrating the processing of the data distribution intermediary system.

Next, the personal data metadata management unit 111 transmits a personal data metadata provision request message M11 to the data provision device 200 and requests provision of the personal data metadata 411 (FIG. 11B). The personal data metadata 411 is disclosed as a data catalog of the personal data stored in the data provision device 200. Meanwhile, even when the personal data metadata 411 is not disclosed as a data catalog, as a right of the data owner, the data owner can request, from the data owner terminal 10 via the data distribution intermediary device 100, the data provision device 200 to provide the personal data metadata 411.

Next, the personal data metadata management unit 111 receives a personal data metadata request response R11 including the personal data metadata 411, which is provided from the data provision device 200, and stores the received personal data metadata 411 shown in FIG. 7 (S11).

Next, the service usage data metadata management unit 112 generates the service usage data metadata 412 shown in FIG. 8 based on the consent procedure information data 422 and based on information on a terms-of-service table including collection, accumulation, and usage application of the personal data (S12), and stores the service usage data metadata 412 (S13).

Next, the data distribution intermediary device 100 receives a service usage data request message M12 from the data usage device 300, and the data distribution control unit 130 determines validity of content of the data request, and accordingly the data distribution intermediary device 100 determines whether to transmit a personal data request message M13 to the data provision device 200 or to transmit a response indicating rejection of the data request to the data usage device 300.

When the data distribution control unit 130 determines that the content of the data request is valid, the personal data request message M13 necessary for the service desired to be newly used by the data owner is transmitted to the data provision device 200.

Even when the service usage data request message M12 from the data usage device 300 is not necessarily present, the personal data request message M13 may be transmitted to the data provision device 200 when the service usage request message M01 is received from the data owner terminal 10.

Next, in response to the request from the data distribution intermediary device 100, the data provision device 200 refers to the consent procedure information data 422, confirms that consent of the user is given, searches for necessary personal data using the user ID and the data item, and transmits a personal data provision response R12 including the necessary personal data 401 to the data distribution intermediary device 100.

Next, the metadata attribute difference detection unit 113 detects a difference between the personal data metadata 411 of FIG. 7 and the service usage data metadata 412 shown in FIG. 8 (S14). As shown in FIG. 8, the scenario-specific service usage data metadata specifying unit 114 detects that in what scenario a service is currently provided, and based on information on the detection, specifies which metadata in a metadata list of FIG. 8 is to be used. As a method for detecting that in what scenario a service is currently provided, for example, detection based on content of the service usage data request message M12 from the data usage device 300 (for example, "steady state" or "emergency state" is attached to a parameter) may be considered. Then, the personal data conversion determination unit 115 determines necessity of conversion of the personal data based on a difference detection result of the metadata obtained by the metadata attribute difference detection unit 113 in S14 (S15). When it is determined that the conversion of the personal data is necessary (S15: Yes), the personal data conversion processing unit 116 performs the conversion processing on the personal data (S16). On the other hand, when it is determined that the conversion of the personal data in S16 is not necessary (S15: No), the conversion processing S16 on the personal data is skipped.

For example, the personal data conversion processing of S16 can be implemented by referring to the script management table 442 shown in FIG. 10 and executing a corresponding script according to a corresponding data item and conversion specifications. In addition, all the data items can be converted by one conversion program.

Next, with respect to the received personal data necessary for the service desired to be newly used, the data distribution intermediary device 100 refers to the data provision and data usage information data 420 and generates the data distribution control data 431 shown in FIG. 9 for providing to the data usage device 300 (S17).

Next, the data distribution intermediary device 100 transmits a service usage data transfer response R13 including the service usage data 402 to the data usage device 300, using the data converted in S16 as the service usage data 402 or without converting the personal data 401. The service usage data transfer response R13 includes the user ID for identifying the data owner, the service ID for identifying the service, and the data items of the service usage data 402 necessary for the service.

Next, the data distribution intermediary device 100 updates a data provision history provided to the data usage device 300 (S18). The data provision history includes the timestamp, the user ID, the service ID, and the data items.

Next, the data usage device 300 uses the data for providing the service (S19) and transmits a service provision notification N11 to the data owner terminal 10.

According to the present embodiment, when a difference exists between content of data collected and stored by the data provider and content of data handled by the service provider who provides a new service, it is possible to determine the necessity of conversion of the data, perform appropriate conversion processing, and then distribute the data. In addition, in cases such as one where data specifications that the data provider holds are changed, one where the service provider starts to provide a new service, or one where the provided service includes a plurality of scenarios, it is possible to, in response to dynamic changes in the data that the data provider holds and the data used in the service, determine the necessity of conversion of the data, perform appropriate conversion processing, and then distribute the data. Thus, it is possible to prevent distribution of data that cannot be used for service provision and activate the data distribution. In addition, although the present embodiment is described with reference to an example related to the distribution of the personal data, the invention is not limited to the personal data and can be applied to corporate data that a company holds, and effects similar to those described above can be obtained.

Second Embodiment

Hereinafter, a second embodiment according to the invention will be described with reference to FIGS. 12 to 15.

In the first embodiment, an example of the data distribution intermediary system is described in which when a difference exists between the content of the data collected and stored by the data provider and the content of the data handled by the service provider who provides a new service, the data distribution intermediary device determines the necessity of conversion of the data and performs appropriate conversion processing.

The present embodiment relates to a system that is based on the data distribution intermediary system of the first embodiment and to which a concept of a privacy rank for privacy protection of a data owner is introduced.

Hereinafter, points different from the data distribution intermediary system according to the first embodiment will be mainly described.

Figure 12:
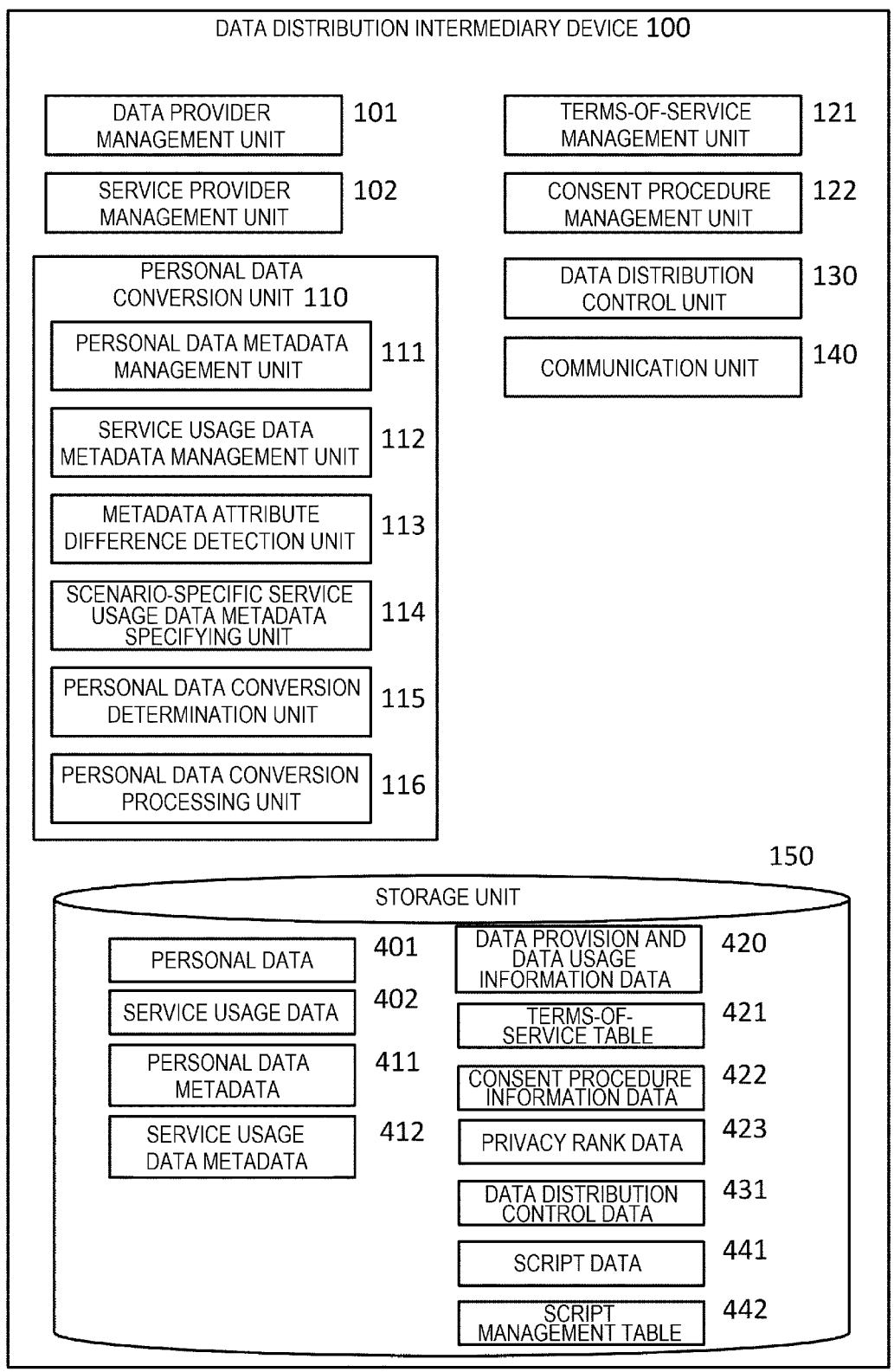
FIG. 12 is a functional configuration diagram of a data distribution intermediary device according to a second embodiment.

First, a functional configuration diagram of a data distribution intermediary device according to the second embodiment will be described with reference to FIG. 12.

The data distribution intermediary device according to the second embodiment is different from that of the first embodiment in that privacy rank data 423 is stored.

Details of the privacy rank data 423 will be described with reference to FIG. 13.

The privacy rank data 423 is data describing a way of data conversion according to a rank for protecting privacy of an individual, and includes, for example, fields of a privacy rank 423a and vehicle position data 423b as shown in FIG. 13.

The privacy rank 423a stores a code representing a privacy rank. The vehicle position data 423b stores a form of a data expression in the service usage data 402.

In the example of FIG. 13, it is set such that the smaller the number of privacy rank is, the stronger the privacy protection is. For example, when a value of the privacy rank 423a is "1", a country code "country code" is used alone as the service usage data. Meanwhile, when the value of the privacy rank 423a is "5", the country code is used alone as the service usage data, while detailed information on where a vehicle is traveling, such as "road ID+road section ID+latitude and longitude", is disclosed.

Next, an example of a terms-of-service table according to the second embodiment will be described with reference to FIG. 14.

The terms-of-service table 421 according to the second embodiment is different from the terms-of-service table 421 of the first embodiment shown in FIG. 6 only in a value of the term content 421c corresponding to the term ID 421a "A6" and the term ID 421b "processing and usage".

In the corresponding content of the term in the terms-of-service table 421 according to the present embodiment, processing of position information data in a steady state and inquiry destination information are described using the privacy rank.

Next, an example of a script management table according to the second embodiment will be described with reference to FIG. 15.

The script management table according to the present embodiment indicates that the attributes of the conversion of the personal data of the data ID 442a "D200" are expressed from an expression "latitude and longitude" of a privacy rank 4 in the before-conversion attribute 442b to an expression "area code" of a privacy rank 3 in the after-conversion attribute 442c, in accordance with the processing content defined in the terms-of-service table 421 of FIG. 14.

As described above, according to the present embodiment, by introducing the privacy rank, only the privacy rank data 423 may be essentially corrected at the time of changing the terms of service, and thus it is possible to reduce modification of the system to the minimum and improve maintainability.

What is claimed is:

1. A data distribution intermediary device for mediating data exchange between a data provision device of a data provider that collects and provides personal data provided by a data owner and a data usage device of a service provider that provides service usage data related to the personal data, the data distribution intermediary device comprising:
 a personal data metadata management unit configured to acquire personal data metadata that is metadata of the personal data stored in the data provision device;
 a service usage data attribute management unit configured to generate service usage data metadata, which is metadata related to the service usage data, based on terms of service related to distribution and usage of the personal data;
 a metadata attribute difference detection unit configured to detect a difference between the personal data metadata and the service usage data metadata;
 a personal data conversion determination unit configured to determine a necessity of conversion processing of the personal data based on the difference of the metadata detected by the metadata attribute difference detection unit; and
 a personal data conversion processing unit configured to convert the personal data to corresponding service usage data, wherein
 the necessity of conversion of the personal data is determined by the personal data conversion determination unit, and when the personal data is determined to be necessary to be converted, the personal data conversion processing unit converts the personal data to the service usage data content based on the service usage data metadata.

2. The data distribution intermediary device according to claim 1, wherein
 the terms of service related to the distribution and usage of the personal data are terms of service acquired by an interaction between the data provision device and the data usage device, and wherein the interaction includes:

a service usage request message, including a service ID, being sent by the data provision device to the data intermediary device, a terms-of-service request message, including the service ID, being sent by the data intermediary device to the data usage device, and a terms-of-service request response, including terms-of-service corresponding to the service ID, being sent by the data usage device to the data intermediary device, wherein the terms-of-service are determined by the service provider which provides a service corresponding to the service ID.

3. The data distribution intermediary device according to claim 1, wherein the personal data conversion processing unit is configured to convert the personal data to the service usage data to match an attribute defined for each data item defined in the service usage data metadata.

4. The data distribution intermediary device according to claim 1, wherein the personal data conversion determination unit is configured to determine the necessity of conversion of the personal data based on a scenario of a service provided by the data usage device.

5. The data distribution intermediary device according to claim 4, wherein the personal data conversion determination unit is configured to vary the personal data to be converted based on scenarios of the service provided by the data usage device.

6. The data distribution intermediary device according to claim 1, wherein privacy rank data is stored, and information related to the terms of service related to the distribution and usage of the personal data based on a privacy rank defined in the privacy rank data is stored.

7. The data distribution intermediary device according to claim 1, wherein information on whether consent is given to the terms of service related to the distribution and usage of the personal data is received from outside, after a service usage data request message is received from the data usage device, the necessity of conversion of the personal data is determined by the personal data conversion determination unit, and when the personal data is determined to be necessary to be converted, the personal data conversion processing unit converts the personal data to the service usage data content based on the service usage data metadata, and the service use data is transmitted to the data usage device.

8. The data distribution intermediary device according to claim 1, wherein the personal data metadata based on a data catalog stored in the data provision device is acquired.

9. A data distribution intermediary method executed by a data distribution intermediary device for mediating data exchange between a data provision device of a data provider that collects and provides personal data provided by a data owner and a data usage device of a service provider that provides service usage data related to the personal data, the data distribution intermediary method comprising:

a step of the data distribution intermediary device acquiring personal data metadata that is metadata of the personal data stored in the data provision device;

a step of the data distribution intermediary device generating service usage data metadata, which is metadata related to the service usage data, based on terms of service related to distribution and usage of the personal data, where the terms of service are acquired by an interaction between the data provision device and the data usage device and wherein the interaction includes:

a service usage request message, including a service ID, being sent by the data provision device to the data intermediary device, a terms-of-service request message, including the service ID, being sent by the data intermediary device to the data usage device, and a terms-of-service request response, including terms-of-service corresponding to the service ID, being sent by the data usage device to the data intermediary device, wherein the terms-of-service are determined by the service provider which provides a service corresponding to the service ID;

a step of the data distribution intermediary device detecting a difference between the personal data metadata and the service usage data metadata; and a step of the data distribution intermediary device determining a necessity of conversion processing of the personal data base on the difference between the metadata detected in the step of detecting the difference between the personal data metadata and the service usage data metadata; and a step of the data distribution intermediary device converting the personal data to the service usage data based on the service usage data metadata when the personal data is determined to be necessary to be converted in the step of determining the necessity of the conversion processing of the personal data, wherein in the step of converting the personal data to the service usage data, the personal data is converted to the service usage data to match an attribute defined for each data item defined in the service usage data metadata.

* * * * *